(12) United States Patent
Patchala et al.

(10) Patent No.: US 12,008,728 B2
(45) Date of Patent: Jun. 11, 2024

(54) APPARATUSES AND METHODS FOR PROCESSING SINGLE INSTRUCTION FOR IMAGE TRANSFORMATION FROM NON-INTEGRAL LOCATIONS

(71) Applicant: QUALCOMM Incorporated, San Diego, CA (US)

(72) Inventors: Venkata Prema Sai Sravan Patchala, Bangalore (IN); Mithil Ramteke, Bangalore (IN); Sridhar Kandimalla, Bengaluru (IN); Himanshu Pradeep Aswani, Pune (IN)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/823,711

(22) Filed: Aug. 31, 2022

(65) Prior Publication Data
US 2024/0070803 A1   Feb. 29, 2024

(51) Int. Cl.
*G06T 3/40* (2006.01)
*G06T 5/77* (2024.01)

(52) U.S. Cl.
CPC . *G06T 3/40* (2013.01); *G06T 5/77* (2024.01)

(58) Field of Classification Search
CPC .................................. G06T 3/40; G06T 5/005
See application file for complete search history.

(56) References Cited

U.S. PATENT DOCUMENTS

| 8,577,185 | B2* | 11/2013 | Mei ................... G06T 3/4007 382/300 |
| 9,547,881 | B2* | 1/2017 | Xu ............................. G06T 1/20 |
| 2002/0145610 | A1* | 10/2002 | Barilovits ................ G09G 5/02 345/531 |
| 2005/0213852 | A1 | 9/2005 | Yoshigahara |
| 2009/0187734 | A1 | 7/2009 | Mejdrich et al. |
| 2013/0163876 | A1* | 6/2013 | Silver ................... G06V 10/44 382/190 |
| 2013/0195187 | A1 | 8/2013 | Kondo |

(Continued)

OTHER PUBLICATIONS

Wilhelmi, W. (1988). Geometric Transformations of Raster Images on SIMD Processors. In Image Analysis and Processing II (pp. 397-404). Boston, MA: Springer US.*

(Continued)

*Primary Examiner* — Sarah Lhymn
(74) *Attorney, Agent, or Firm* — QUALCOMM Incorporated

(57) ABSTRACT

A processor pipeline circuit in a processor for non-integral transformation of an image utilizing a single instruction is disclosed. The processor pipeline circuit comprises a data fetch circuit configured to receive a memory address of the input image and fetch a plurality of pixels of the input image. The processor pipeline circuit further comprises a weights access circuit configured to receive an element of the array of offsets and the interpolation type parameter. The weights access circuit is configured to determine weights to be applied to the plurality of pixels of the input image. The processor pipeline circuit further comprises a multiply and add circuit configured to calculate the output pixel of the transformed image by multiplying the plurality of pixels of the input image by the weights and summing each resulting product.

19 Claims, 5 Drawing Sheets

(56) References Cited

U.S. PATENT DOCUMENTS

| | | | |
|---|---|---|---|
| 2016/0191946 A1* | 6/2016 | Zhou | H04N 19/17 |
| | | | 375/240.16 |
| 2016/0225119 A1* | 8/2016 | Xu | G06T 1/60 |
| 2017/0078677 A1* | 3/2017 | Park | H04N 19/184 |
| 2019/0297326 A1* | 9/2019 | Reda | H04N 19/172 |
| 2021/0142448 A1 | 5/2021 | Yao et al. | |
| 2021/0201559 A1* | 7/2021 | Gruen | G06T 15/06 |
| 2022/0051467 A1* | 2/2022 | Woop | G06T 15/06 |
| 2022/0051476 A1* | 2/2022 | Woop | G06T 3/4007 |
| 2022/0067983 A1* | 3/2022 | Fidler | G06F 18/214 |
| 2023/0046994 A1* | 2/2023 | Zhang | H04N 19/70 |

OTHER PUBLICATIONS

International Search Report and Written Opinion for International Patent Application No. PCT/US2023/070808, dated Nov. 8, 2023, 16 pages.

\* cited by examiner

APPARATUSES AND METHODS FOR PROCESSING SINGLE INSTRUCTION FOR IMAGE TRANSFORMATION FROM NON-INTEGRAL LOCATIONS

BACKGROUND

I. Field of the Disclosure

The technology of the disclosure relates generally to processors configured to execute Single Instruction Multiple Data (SIMD) instructions, and particular to processors configured to execute SIMD instructions for transforming an image from its non-integral locations.

II. Background

An image may need to be transformed for various reasons. Transformation of in image may include downscaling, upscaling, eliminating distortion, or a combination of scaling and distortion elimination. In one example, transforming an image captured by a fisheye lens camera is both downscaled and undistorted. Fisheye lens cameras are used prevalently in security and self-driving applications. Fisheye lens cameras are useful in expanding the viewable range of a camera but, as a result, portions of a captured image will be distorted. In order to identify particular objects in an image and, perhaps, make automated decisions, an image captured from a fisheye lens camera will need to have its distortion removed. When performing this transformation, the original image is typically downscaled such that the number of pixels in the output image is less than the number of pixels in the input image. As such, there is not a direct scalar mapping from one pixel in the input image to one pixel in the output image.

To determine an output pixel of the output image, a transformation process begins with a theoretical x, y coordinate location of a pixel in the input image, for which the output is based. At least one axis of the x, y coordinate has a floating point value. In other words, the desired pixel of the input image to transform to a particular output image exists theoretically and is located at a non-integral coordinate of the input image. Since actual input pixels are located at scalar values of x, y coordinates, a transformation process has to select actual input pixels that are near the theoretical floating point coordinates to approximate the theoretical pixel location. In particular, each output pixel is determined by a combination of input pixels near or around the floating point location and weights associated with those input pixels and applied to the combination of input pixels.

Conventionally, image transformation is done in software code executing on a single instruction multiple data (SIMD) processor. However, programmers of SIMD processors code these non-integral transformation algorithms on a pixel-by-pixel basis. Today's programmers, when developing code to make this transformation, have to utilize a series of base SIMD instructions on a pixel-by-pixel basis, to determine how many pixels from the input image should be loaded into a processor pipeline, load a number of input pixels, load weights associated with the number of input pixels, and determine how to compute an output pixel based on some equation associated with the number of input pixels and weights, and compute the output pixel. As a result, today's software code for this image processing is rather inefficient from a power savings and a throughput perspective.

SUMMARY

Aspects disclosed in the detailed description include apparatus and methods for processing a single instruction for image transformation from non-integral locations of an input image. The instruction includes a memory address of an input image, a memory address of an output image, an array of offsets associated with the output image, and an interpolation type parameter. Utilizing a single instruction to perform image transformation from non-integral locations of an input image frees the programmer, on an output pixel by pixel basis, from breaking down each operation and utilizing a series of multiple base instructions to determine which and how many pixels of the input image should be loaded into a processor pipeline, to determine how much to weight each loaded pixel, to load and store interim computed values, and to compute the output pixel on those selected choices. Additionally, processing a single instruction allows a processor pipeline to avoid loading and storing interim computed values thereby saving power and increasing system throughput.

In this regard in one exemplary aspect, an apparatus for processing a single instruction for non-integral transformation of an image. The apparatus comprises a processor pipeline circuit, the processor pipeline circuit configured to receive a single instruction containing a memory address of an input image, a second memory address of an output image, an array of offsets associated with the output image, and an interpolation type parameter. The processor pipeline circuit is further configured to write an output pixel of a transformed image. The processor pipeline circuit further comprises a data fetch circuit configured to receive the memory address of the input image, the data fetch circuit further configured to fetch a plurality of pixels of the input image. The processor pipeline circuit further comprises a weights access circuit configured to receive an element of the array of offsets and the interpolation type parameter, the weights access circuit configured to determine weights to be applied to the plurality of pixels of the input image. The processor pipeline circuit further comprises a multiply and add circuit configured to calculate the output pixel of the transformed image by multiplying the plurality of pixels of the input image by the weights and summing each resulting product. The processor pipeline circuit further comprises an output data circuit configured to receive the second memory address of the output image and the output pixel from the multiply and add circuit, the output data circuit configured to write the output pixel of the transformed image to memory.

In another exemplary aspect, a method of processing a single instruction for non-integral transformation of an image. The method comprises receiving a single instruction containing a memory address of an input image, a second memory address of an output image, an array of offsets associated with the output image, and an interpolation type parameter. The method further comprising fetching a plurality of pixels of the input image from memory based on the memory address of the input image. The method further comprising determining weights to be applied to the plurality of pixels of the input image based on an element of the array of offsets and the interpolation type parameter. The method further comprising calculating an output pixel of a transformed image by multiplying the plurality of pixels of the input image by the weights and summing each resulting product and writing the output pixel of the transformed image to memory.

In another exemplary aspect, a non-transitory computer-readable storage medium comprising instructions executable by a processor, which when executed by the processor causes the processor to perform image transformation single instruction multiple data (SIMD) operation. The non-transitory computer-readable storage medium, comprising a SIMD instruction which specifies a memory address of an input image, a memory address of an output image, an array of offsets associated with the output image, and an interpolation type parameter. The non-transitory computer-readable storage medium further comprising code for fetching a plurality of pixels of the input image based on the memory address of the input image, code for determining weights to be applied to the plurality of pixels of the input image based on an element of the array of offsets and the interpolation type parameter, code for calculating the output pixel of the transformed image by multiplying the plurality of pixels of the input image by the weights and summing each resulting product, and code for writing the output pixel of the transformed image to memory.

DETAILED DESCRIPTION

Figure 1:
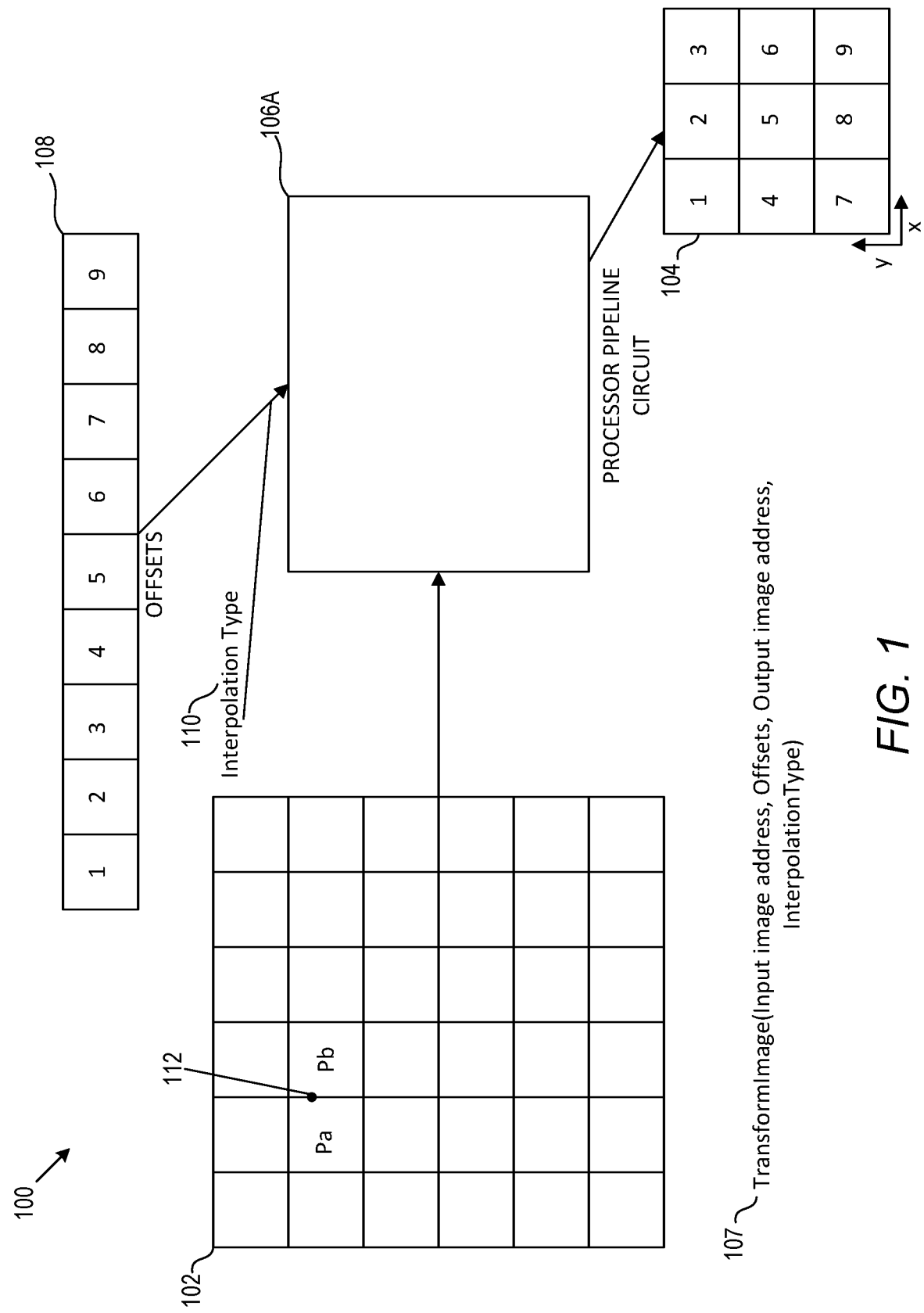
FIG. 1 is a high-level block diagram of an exemplary transformation of a 6×6 image to a 3×3 image.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Utilizing a single instruction to perform image transformation from non-integral locations of an input image frees the programmer, on an output pixel by pixel basis, from breaking down each operation and utilizing a series of multiple base instructions to determine which and how many pixels of the input image should be loaded into a processor pipeline, to determine how much to weight each loaded pixel, to load and store interim computed values, and to compute the output pixel on those selected choices. Additionally, processing a single instruction allows a processor pipeline to avoid loading and storing interim computed values thereby saving power and increasing system throughput.

In this regard, FIG. 1 is a high-level block diagram 100 of an exemplary transformation of a 6×6 input image 102 to a 3×3 output image 104 by a processor pipeline circuit 106A receiving a single instruction 107, named "TransformImage" for convenience. The processor pipeline circuit 106A receives the single instruction 107 which includes an array of offsets 108 and interpolation type parameter 110 to transform input image 102 to the output image 104. The single instruction 107 also includes the address of input image 102 and the address of output image 104. The number of offsets in the array of offsets 108 is equal to the number of pixels in the output image 104. For the example shown in FIG. 1, there are nine (9) elements in the array of offsets 108. Each element of the array of offsets 108 is a tuple of at least one floating-point number that represent the x and y coordinates of the theoretical pixels in the input image 102 which would be transformed to an output pixel in the output image 104. For example, element 1 of the array of offsets 108 contains the coordinate (2.5, 4.7) which maps to theoretical point 112 of input image 102. Since one of the 36 pixels in input image 102 doesn't directly to theoretical point 112, the processor pipeline circuit 106A will use actual pixels of input image 102 near theoretical point 112 to produce pixel 1 of the output image 104. Interpolation type parameter 110 will indicate which pixels in input image 102 that will be needed to produce pixel 1 in the output image 104. Interpolation type parameter 110 may indicate various interpolations including bilinear 1×2 interpolation, bilinear 2×1 interpolation, bilinear 2×2 interpolation, bilinear 3×3 interpolation, or any other multi-linear interpolation.

In the example shown in FIG. 1, interpolation type parameter 110 is a bilinear 1×2 interpolation which means two pixels have the same y axis but have different x axes and are near to the theoretical point indicated in the corresponding element in the array of offsets 108 will be used in the transformation process. In FIG. 1, pixel Pa and pixel Pb will be fetched from input image 102 and processed by the processor pipeline circuit 106A. Bilinear 2×1 interpolation means two pixels having the same x indices but having different y indices will be utilized from input image 102. Bilinear 2×2 interpolation means that four pixels near the theoretical point will be utilized from input image 102. Bilinear 3×3 interpolation means nine pixels near the theoretical point will be utilized from the input image 102 for the transformation process. Interpolation type parameter 110 may include any of these types of bilinear interpolations in addition to other types of interpolations. Optionally, each element in the array of offsets 108 may include a set of weights for each of the pixels in input image 102 that will be used subsequently in the transformation process performed by the processor pipeline circuit 106A.

Additionally, processor pipeline circuit 106A will iterate through the array of offsets 108 to process the nearest pixels of the input image 102 according to interpolation type parameter 110 which correspond to the coordinates contained in the array of offsets 108 to produce pixels 2-9 and write output image 104 to memory. As will be discussed in connection with FIG. 3, this iteration will be performed in parallel by multiple processor pipeline circuits.

Figure 2:
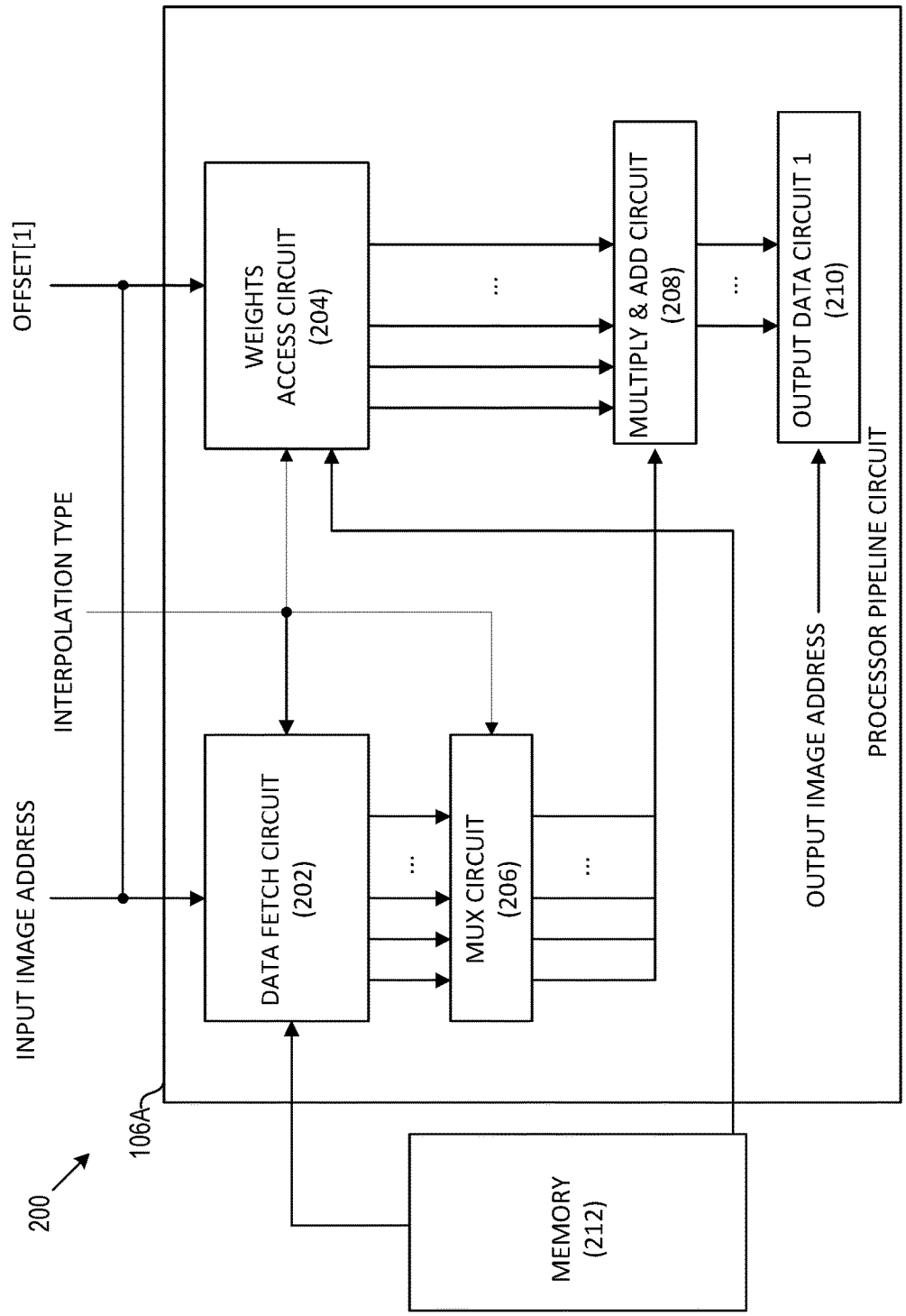
FIG. 2 is a block diagram of a processor pipeline circuit in a processor for transforming one or more pixels of an input image to a single output pixel.

FIG. 2 is a block diagram of a processor pipeline circuit 106A in a processor 200 for transforming one or more pixels of an input image 102 to a single output pixel. Processor pipeline circuit 106A includes a data fetch circuit 202, a weights access circuit 204, an optional multiplexer circuit 206, a multiply and add circuit 208, and an output data circuit 210. The processor pipeline circuit 106A receives and writes data to memory 212.

The data fetch circuit 202 receives the address of the input image and fetches from memory 212 pixels of input image 102. In one aspect, data fetch circuit 202 also receives the first element of the array of offsets 108 and retrieves a set of pixels of the input image 102 surrounding a non-integral coordinate expressed in the first element of the array of offsets 108. For example, the data fetch circuit 202 may fetch nine (9) pixels surrounding the non-integral coordinate. In this example, the retrieved pixels would be sent to multiplexer circuit 206 which would receive interpolation type parameter 110 as input. The multiplexer circuit 206 would activate a subset of n lines to the multiply & add circuit 208 based on the interpolation type parameter 110. The activated subset of lines to the multiply and add circuit 208 correspond to the pixels of the input image 102 that will be used for the transformation process in the multiply and add circuit 208. For example, if the interpolation type indicated a bilinear 1×2 interpolation, n=3 lines would be activated between the multiplexer circuit 206 and the multiply & add circuit 208 even though 9 pixels were fetched. In another example, if the interpolation type indicated a bilinear 2×2 interpolation, n=4 lines would be activated. In another example, if the interpolation type indicated a 3×3 interpolation, n=9 lines would be activated.

In an alternative aspect, the data fetch circuit 202 would receive the interpolation type parameter 110 and fetch the needed amount of pixels from memory 212 as specified by the interpolation type parameter 110. In this example, that would be 3 pixels. In this alternative aspect, the multiplexer circuit 206 would not be needed. The activated subset of lines to the multiply and add circuit 208 from the data fetch circuit 202 correspond to the pixels of the input image 102 that will be used for the transformation process in the multiply and add circuit 208.

Please note that the examples are discussed to address a gray scale image for simplicity and clarity. However, the disclosure applies to multi-dimensional images, multi-channel images or both. In the case of multi-dimensional images such as tensors the coordinates of the pixels including the coordinates carried in the array of offsets 108 will have a z-axis to represent a depth coordinate. In the case of a multi-channel image, each pixel fetched and generated would have multiple channels. For example, a pixel in a red, green, blue (RGB) image would include 3 channels; a red channel, a green channel, and a blue channel.

The weights access circuit 204 receives the first element of the array of offsets 108 and the interpolation type parameter 110. In one aspect, the weights access circuit 204 calculates the weights. In this aspect, the weights access circuit calculates the weights as follows when the interpolation type parameter 110 is a bilinear 1×2 or 2×1 interpolation.

$$Wa=\text{Ceil}(\text{offset}[1])-\text{offset}[1] \quad (1)$$

$$Wb=\text{offset}[1]-\text{Floor}(\text{offset}[1]) \quad (2)$$

Wa is the weight of input pixel Pa, Wb is the weight of input pixel Pb, offset[1] is the first element in the array of offsets 108, Ceil(x) is a function that computes the smallest integer that is greater than or equal to x, and Floor(x) is a function that computes the largest integer less than or equal to x.

If the interpolation type parameter 110 is a 2×2 bilinear interpolation, the weights access circuit 204 calculates the weights as follows:

$$Wa=Wx*Wy$$

$$Wb=Wx*(1-Wy)$$

$$Wc=(1-Wx)*Wy$$

$$Wd=(1-Wx)*(1-Wy)$$

where $$Wx=\text{Ceil}(\text{offsetX}[1]-\text{offsetX}[1])$$

$$Wy=\text{Ceil}(\text{offsetY}[1]-\text{offsetY}[1])$$

Wa is the weight of input pixel Pa, Wb is the weight of input pixel Pb, Wc is the weight of input pixel Pc, and Wd is the weight of input pixel Pd. offsetX[1] is the x-axis coordinate in the first element in the array of offsets 108 and offset[1] is the y-axis coordinate in the first element in the array of offsets 108.

If the interpolation type parameter 110 is a 3×3 bilinear interpolation, there would be multiple different ways of weighting the 9 input pixels to generate one pixel. Any combination of W1 . . . W9 that satisfies the Sum(Wi)=1 and Wi>=0 is a valid candidate for interpolation.

In an alternative aspect, the weights are predetermined and stored in memory 212. In this aspect, the weights access circuit 204 accesses memory or register file to retrieve the weights.

In all aspects, the weights access circuit 204 forwards the weights to the multiply and add circuit 208 corresponding to the pixels received at the multiply & add circuit 208.

The multiply & add circuit 208 performs the following calculation to transform the pixels of input image 102 to one output pixel, output[0], based on the fetched input pixels and the computed weights in the bilinear 1×2 interpolation:

$$\text{output}[1]=(Pa*Wa)+(Pb*Wb) \quad (3)$$

As shown in equation (3), the output[1] pixel is computed multiplying the plurality of pixels of the input image by the weights and summing each resulting product.

Figure 3:
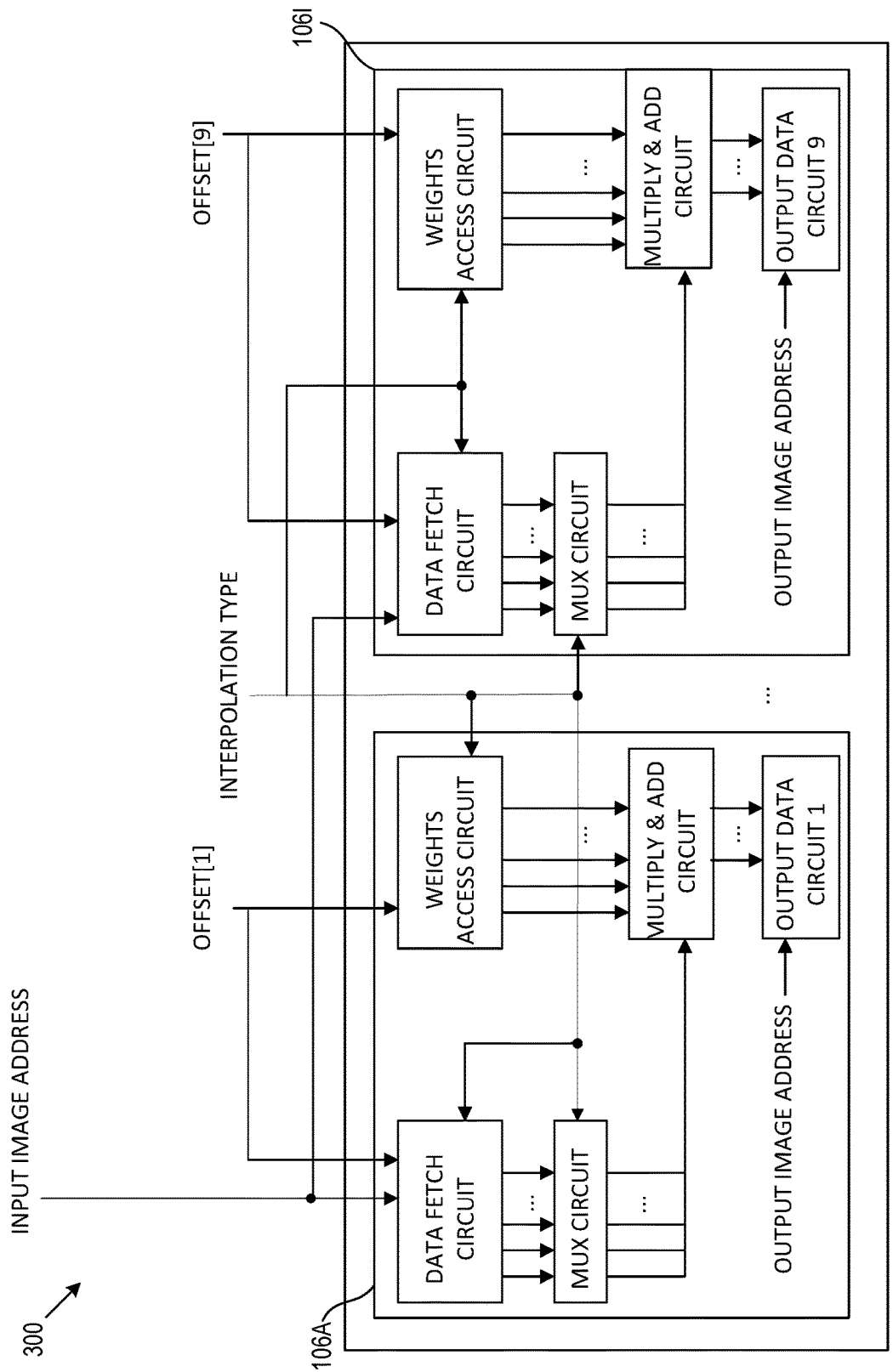
FIG. 3 is a block diagram of multiple processor pipeline circuits in a processor(s) for transforming an input image to an output image in response to execution of a single instruction.

FIG. 3 is a block diagram 300 of multiple processor pipeline circuits 106A-106I for transforming a 6×6 input image 102 to an output image 104 with a single instruction. Processor pipeline circuits 106A-106I may be deployed in a SIMD machine. Each processor pipeline circuits 106A-106I will receive a respective element of the array of offsets 108. For example, processor pipeline circuit 106A receives the first element of the array of offsets 108, offset[1] while processor pipeline circuit 106I receives the ninth element, offset[9]. Processor pipeline circuits 106B-106I will each retrieve pixels from the input image 102 according to the respective individual element of the array of offsets 108 they receive and perform the same operations in the same way as described for processor pipeline circuit 106A as discussed in connection with FIG. 2. The number of processor pipeline circuits is determined by the number of output pixels in a transformed image. Although the example describe shows 9 pixels for illustrative purposes, there could be hundreds of processor pipeline circuits deployed in a SIMD machine.

Figure 4:
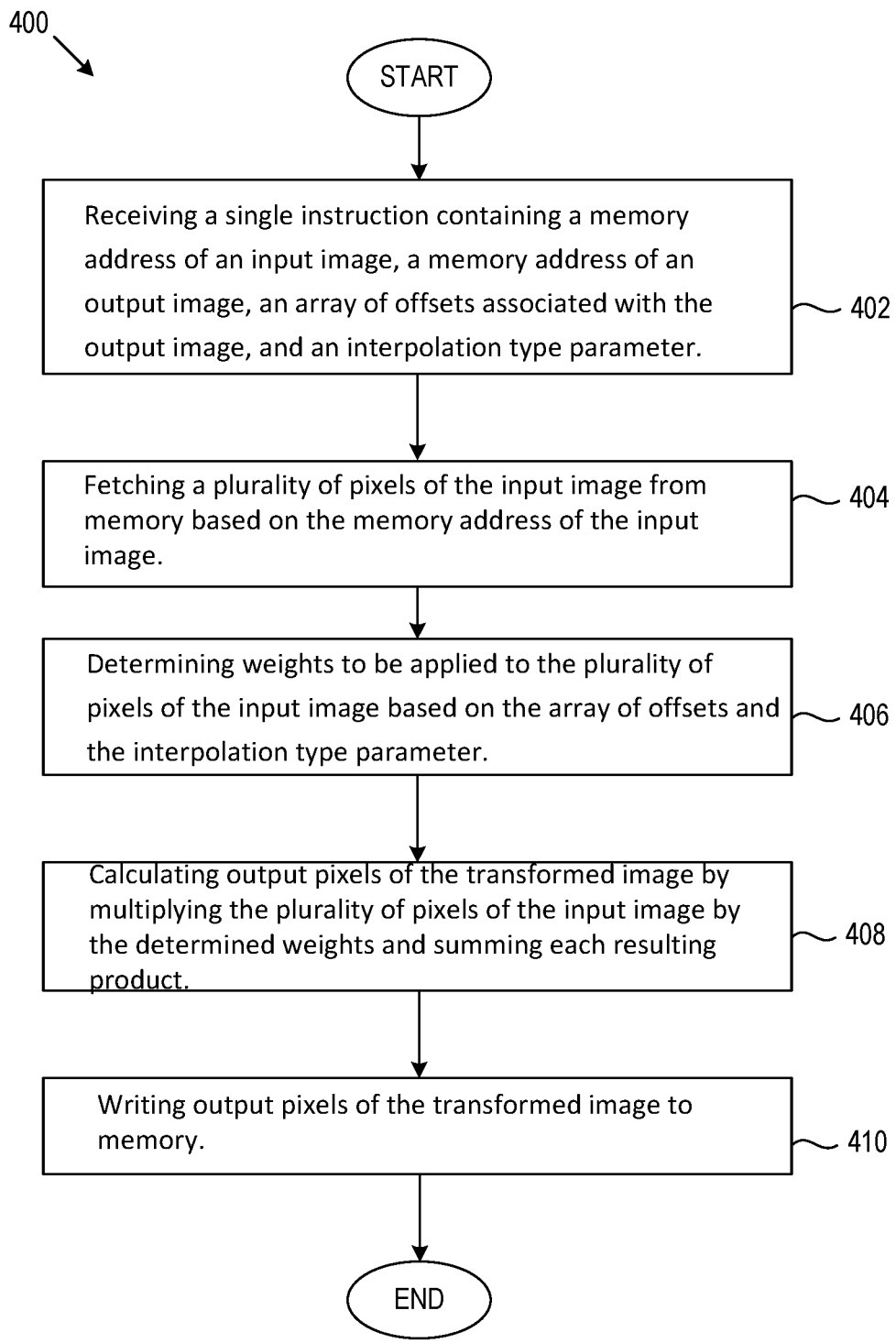
FIG. 4 is a flowchart illustrating an exemplary process of a processor transforming an input image to an output image in response to execution of a single instruction.

FIG. 4 is a flowchart 400 illustrating an exemplary method for transforming an input image to an output image with a single instruction. At block 402, the method begins with receiving a single instruction containing a memory address of an input image, a memory address of an output image, and array of offsets associated with the output image, and an interpolation type parameter. At block 404, the method continues with fetching a plurality of pixels of the input image from memory based on the memory address of the input image. At block 406, the method continues with determining weights to be applied to the plurality of pixels of the input image based on the array of offsets and the interpolation type parameter. At block 408 the method continues with calculating output pixels of the transformed image by multiplying the plurality of pixels of the input image by the determined weights and summing each resulting product. At block 410, the method completes by writing the output pixels of the transformed image to memory.

The single instruction for image transformation from non-integral locations according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, and a vehicle component.

Figure 5:
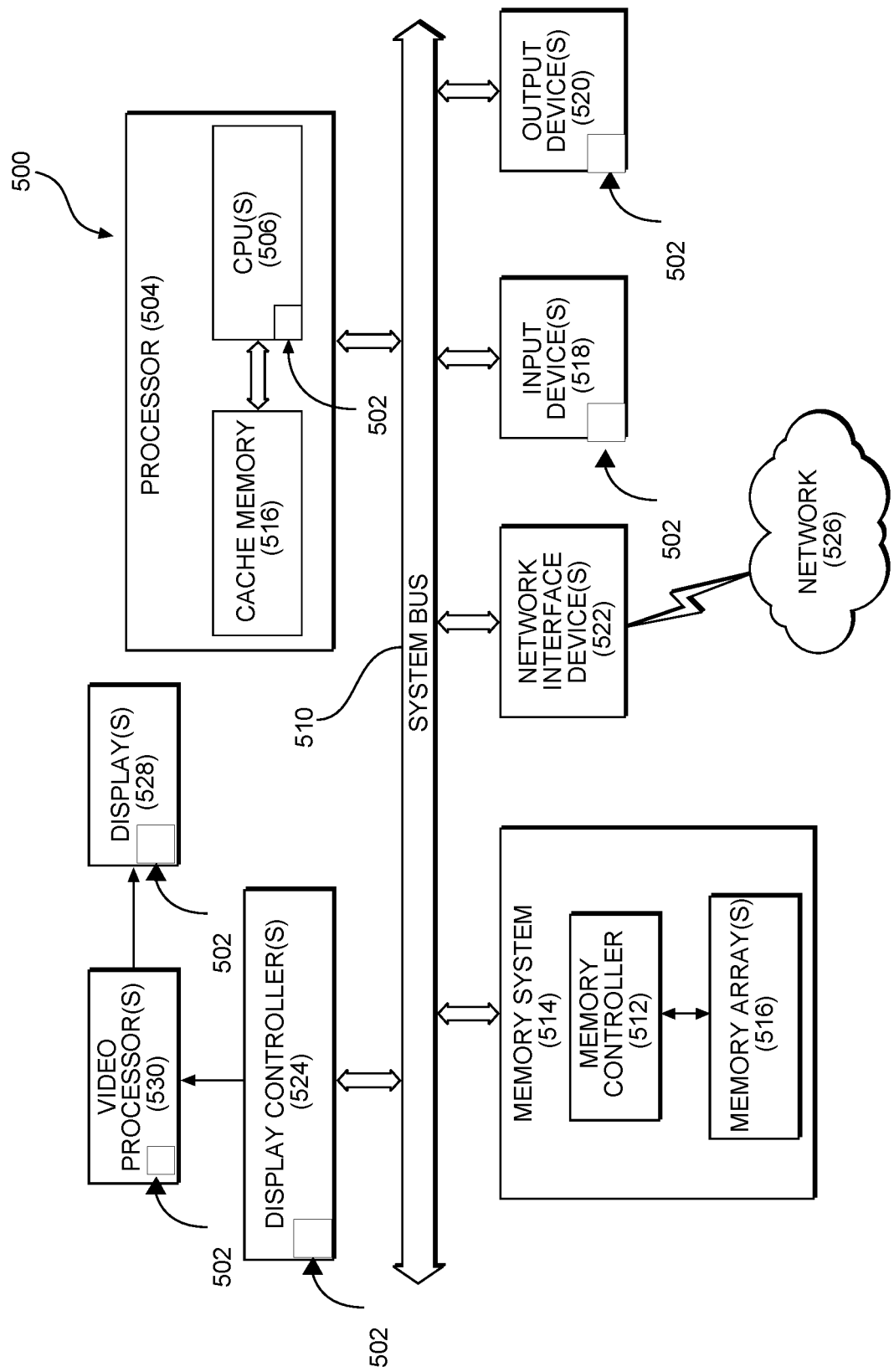
FIG. 5 is a block diagram of an exemplary processor-based system that can include a processor that includes a processor pipeline circuit configured to transform one or more pixels of an input image to a single output pixel based on execution of a single instruction, including but not limited to the processor pipeline circuits in FIGS. 1-3.

In this regard, FIG. 5 illustrates an example of a processor-based system 500 that can employ a processor pipeline circuit 502, such as processor pipeline circuits 106A-106I discussed in connection with FIGS. 1-3. In this example, the processor-based system 500 includes a processor 504 having one or more central processing units (CPUs) 506. The CPU(s) 506 may have cache memory 516 coupled to the CPU(s) 506 for rapid access to temporarily stored data. The CPU(s) 506 is coupled to a system bus 510 and can intercouple devices included in the processor-based system 500. As is well known, the CPU(s) 506 communicates with these other devices by exchanging address, control, and data information over the system bus 510. For example, the CPU(s) 506 can communicate bus transaction requests to a memory controller 512. Although not illustrated in FIG. 5, multiple system buses 510 could be provided, wherein each system bus 510 constitutes a different fabric.

Other devices can be connected to the system bus 510. As illustrated in FIG. 5, these devices can include a memory system 514, one or more input devices 518, one or more output devices 520, one or more network interface devices 522, and one or more display controllers 524, as examples. The input device(s) 518 can include any type of input device, including, but not limited to, input keys, switches, voice processors, etc. The output device(s) 520 can include any type of output device, including, but not limited to, audio, video, other visual indicators, etc. The network interface device(s) 522 can be any devices configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 522 can be configured to support any type of communications protocol desired. The memory system 514 can include one or more memory arrays 516.

The CPU(s) 506 may also be configured to access the display controller(s) 524 over the system bus 510 to control information sent to one or more displays 528. The display controller(s) 524 sends information to the display(s) 528 to be displayed via one or more video processors 530, which process the information to be displayed into a format suitable for the display(s) 528. The display(s) 528 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium wherein any such instructions are executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects/clauses:

1. An apparatus for non-integral transformation of an image, comprising:
   a processor pipeline circuit, the processor pipeline circuit configured to receive a single instruction containing a memory address of an input image, a second memory address of an output image, an array of offsets associated with the output image, and an interpolation type parameter, the processor pipeline circuit configured to write an output pixel of a transformed image, the processor pipeline circuit comprising:
      a data fetch circuit configured to receive the memory address of the input image, the data fetch circuit further configured to fetch a plurality of pixels of the input image;
      a weights access circuit configured to receive an element of the array of offsets and the interpolation type parameter, the weights access circuit configured to determine weights to be applied to the plurality of pixels of the input image;
      a multiply and add circuit configured to calculate the output pixel of the transformed image by multiplying the plurality of pixels of the input image by the weights and summing each resulting product; and
      an output data circuit configured to receive the second memory address of the output image and the output pixel from the multiply and add circuit, the output data circuit configured to write the output pixel of the transformed image to memory.
2. The apparatus of clause 1, wherein the array of offsets include x,y coordinates where at least one axis has a floating point value.
3. The apparatus of clauses 1 or 2, wherein the weights access circuit computes the weights based on the element of the array of offsets and the interpolation type parameter.
4. The apparatus of clauses 1 or 2, wherein the weights access circuit determines the weights by retrieving the weights from memory based on the element of the array of offsets.
5. The apparatus of clauses 1, 2, 3, or 4, wherein the output pixel comprises three channels, the three channels including a red channel, a green channel, and a blue channel.
6. The apparatus of clause 1, further comprising a multiplexer circuit coupled to the data fetch circuit with n lines, the multiplexer circuit configured to receive the interpolation type parameter and to select an active subset of n lines carrying the plurality of pixels of the input image to the multiply and add circuit, each active line representing one pixel of the plurality of pixels of the input image.
7. The apparatus of clauses 1, 2, 3, 4, 5, or 6, wherein the interpolation type parameter is a bilinear 1×2 interpolation, bilinear 2×1 interpolation, bilinear 2×2 interpolation, bilinear 3×3 interpolation, or a multi-linear interpolation.
8. The apparatus of clause 6, wherein the interpolation type parameter is bilinear 1×2 interpolation, and wherein the active subset of n lines is 2 lines.
9. The apparatus of clause 6, wherein the interpolation type parameter is bilinear 2×2 interpolation, and wherein the active subset of n lines is 4 lines.
10. The apparatus of clause 6, wherein the interpolation type parameter is bilinear 3×3 interpolation, and wherein the active subset of n lines is 9 lines.
11. A method for non-integral transformation of an image, comprising:
    receiving a single instruction containing a memory address of an input image, a second memory address of an output image, an array of offsets associated with the output image, and an interpolation type parameter;
    fetching a plurality of pixels of the input image from memory based on the memory address of the input image;
    determining weights to be applied to the plurality of pixels of the input image based on an element of the array of offsets and the interpolation type parameter;
    calculating an output pixel of a transformed image by multiplying the plurality of pixels of the input image by the weights and summing each resulting product; and
    writing the output pixel of the transformed image to the second memory address.
12. The method of clause 11, wherein the array of offsets include x,y coordinates where at least one axis has a floating point value.
13. The method of clauses 11 or 12, wherein the interpolation type parameter is a bilinear 1×2 interpolation, bilinear 2×1 interpolation, bilinear 2×2 interpolation, bilinear 3×3 interpolation, or multi-linear interpolation.
14. The method of clauses 11 or 12, wherein the interpolation type parameter is bilinear 1×2 interpolation.
15. The method of clauses 11 or 12, wherein the interpolation type parameter is bilinear 2×2 interpolation.
16. A non-transitory computer-readable storage medium comprising instructions executable by a processor, which when executed by the processor causes the processor to perform an image transformation utilizing a single instruction multiple data (SIMD) operation, the non-transitory computer-readable storage medium, comprising:
    a SIMD instruction which specifies:
      a memory address of an input image;
      a second memory address of an output image;
      an array of offsets associated with the output image;
      an interpolation type parameter; and
      code for fetching a plurality of pixels of the input image based on the memory address of the input image;
      code for determining weights to be applied to the plurality of pixels of the input image based on an element of the array of offsets and the interpolation type parameter;
      code for calculating an output pixel of a transformed image by multiplying the plurality of pixels of the input image by the weights and summing each resulting product; and code for writing the output pixel of the transformed image to the second memory address.

17. The non-transitory computer-readable storage medium of clause 16, wherein the interpolation type parameter is a bilinear 1×2 interpolation, bilinear 2×1 interpolation, bilinear 2×2 interpolation, bilinear 3×3 interpolation, or multi-linear interpolation.

18. The non-transitory computer-readable storage medium of clause 16, wherein the interpolation type parameter is bilinear 1×2 interpolation.

19. The non-transitory computer-readable storage medium of clause 16, wherein the interpolation type parameter is bilinear 2×2 interpolation.

What is claimed is:

1. An apparatus for non-integral transformation of an image, comprising:
    a processor pipeline circuit, the processor pipeline circuit configured to receive a single instruction containing a memory address of an input image, a second memory address of an output image, an array of offsets associated with the output image, and an interpolation type parameter, the processor pipeline circuit configured to write an output pixel of a transformed image, the processor pipeline circuit comprising:
        a data fetch circuit configured to receive the memory address of the input image, the data fetch circuit further configured to fetch a plurality of pixels of the input image;
        a weights access circuit configured to receive an element of the array of offsets and the interpolation type parameter, the weights access circuit configured to determine weights to be applied to the plurality of pixels of the input image;
        a multiply and add circuit configured to calculate the output pixel of the transformed image by multiplying the plurality of pixels of the input image by the weights and summing each resulting product; and
        an output data circuit configured to receive the second memory address of the output image and the output pixel from the multiply and add circuit, the output data circuit configured to write the output pixel of the transformed image to memory.

2. The apparatus of claim 1, wherein the array of offsets include x,y coordinates where at least one axis has a floating point value.

3. The apparatus of claim 1, wherein the weights access circuit computes the weights based on the element of the array of offsets and the interpolation type parameter.

4. The apparatus of claim 1, wherein the weights access circuit determines the weights by retrieving the weights from memory based on the element of the array of offsets.

5. The apparatus of claim 1, wherein the output pixel comprises three channels, the three channels including a red channel, a green channel, and a blue channel.

6. The apparatus of claim 1, further comprising a multiplexer circuit coupled to the data fetch circuit with n lines, the multiplexer circuit configured to receive the interpolation type parameter and to select an active subset of n lines carrying the plurality of pixels of the input image to the multiply and add circuit, each active line representing one pixel of the plurality of pixels of the input image.

7. The apparatus of claim 1, wherein the interpolation type parameter is a bilinear 1×2 interpolation, bilinear 2×1 interpolation, bilinear 2×2 interpolation, bilinear 3×3 interpolation, or a multi-linear interpolation.

8. The apparatus of claim 6, wherein the interpolation type parameter is bilinear 1×2 interpolation, and wherein the active subset of n lines is 2 lines.

9. The apparatus of claim 6, wherein the interpolation type parameter is bilinear 2×2 interpolation, and wherein the active subset of n lines is 4 lines.

10. The apparatus of claim 6, wherein the interpolation type parameter is bilinear 3×3 interpolation, and wherein the active subset of n lines is 9 lines.

11. A method for non-integral transformation of an image, comprising:
    receiving a single instruction containing a memory address of an input image, a second memory address of an output image, an array of offsets associated with the output image, and an interpolation type parameter;
    fetching a plurality of pixels of the input image from memory based on the memory address of the input image;
    determining weights to be applied to the plurality of pixels of the input image based on an element of the array of offsets and the interpolation type parameter;
    calculating an output pixel of a transformed image by multiplying the plurality of pixels of the input image by the weights and summing each resulting product; and
    writing the output pixel of the transformed image to the second memory address.

12. The method of claim 11, wherein the array of offsets include x,y coordinates where at least one axis has a floating point value.

13. The method of claim 11, wherein the interpolation type parameter is a bilinear 1×2 interpolation, bilinear 2×1 interpolation, bilinear 2×2 interpolation, bilinear 3×3 interpolation, or multi-linear interpolation.

14. The method of claim 11, wherein the interpolation type parameter is bilinear 1×2 interpolation.

15. The method of claim 11, wherein the interpolation type parameter is bilinear 2×2 interpolation.

16. A non-transitory computer-readable storage medium comprising instructions executable by a processor, which when executed by the processor causes the processor to perform an image transformation utilizing a single instruction multiple data (SIMD) operation, the non-transitory computer-readable storage medium, comprising:
    a SIMD instruction which specifies:
        a memory address of an input image;
        a second memory address of an output image;
        an array of offsets associated with the output image;
        an interpolation type parameter; and
        code for fetching a plurality of pixels of the input image based on the memory address of the input image;
        code for determining weights to be applied to the plurality of pixels of the input image based on an element of the array of offsets and the interpolation type parameter;
        code for calculating an output pixel of a transformed image by multiplying the plurality of pixels of the input image by the weights and summing each resulting product; and
        code for writing the output pixel of the transformed image to the second memory address.

17. The non-transitory computer-readable storage medium of claim 16, wherein the interpolation type parameter is a bilinear 1×2 interpolation, bilinear 2×1 interpolation, bilinear 2×2 interpolation, bilinear 3×3 interpolation, or multi-linear interpolation.

18. The non-transitory computer-readable storage medium of claim 16, wherein the interpolation type parameter is bilinear 1×2 interpolation.

19. The non-transitory computer-readable storage medium of claim 16, wherein the interpolation type parameter is bilinear 2×2 interpolation.

\* \* \* \* \*